Nov. 6, 1956     E. A. SCHONROCK     2,769,661
TAIL GATE, APRON AND AXLE PLACEMENT
CONSTRUCTION FOR DUMP TRAILERS
Filed June 29, 1953     2 Sheets-Sheet 1
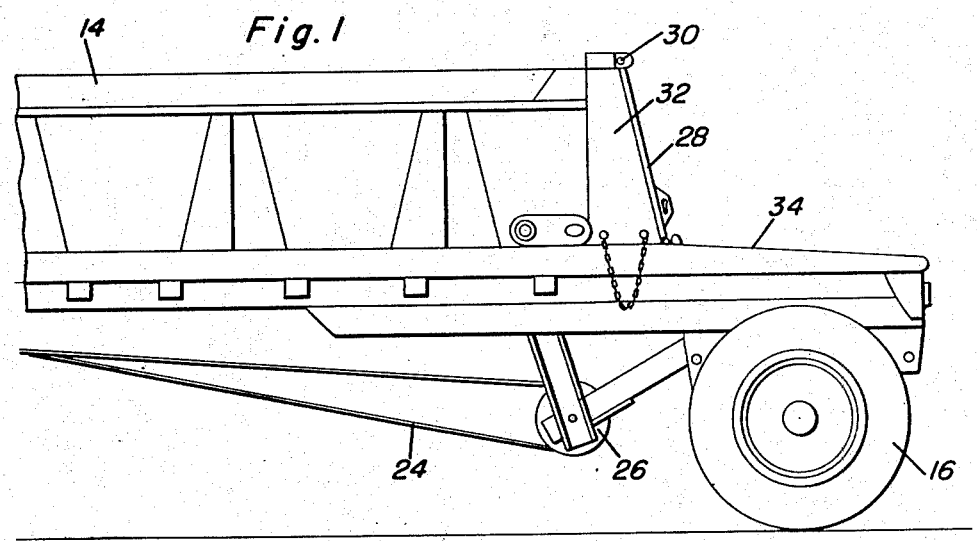
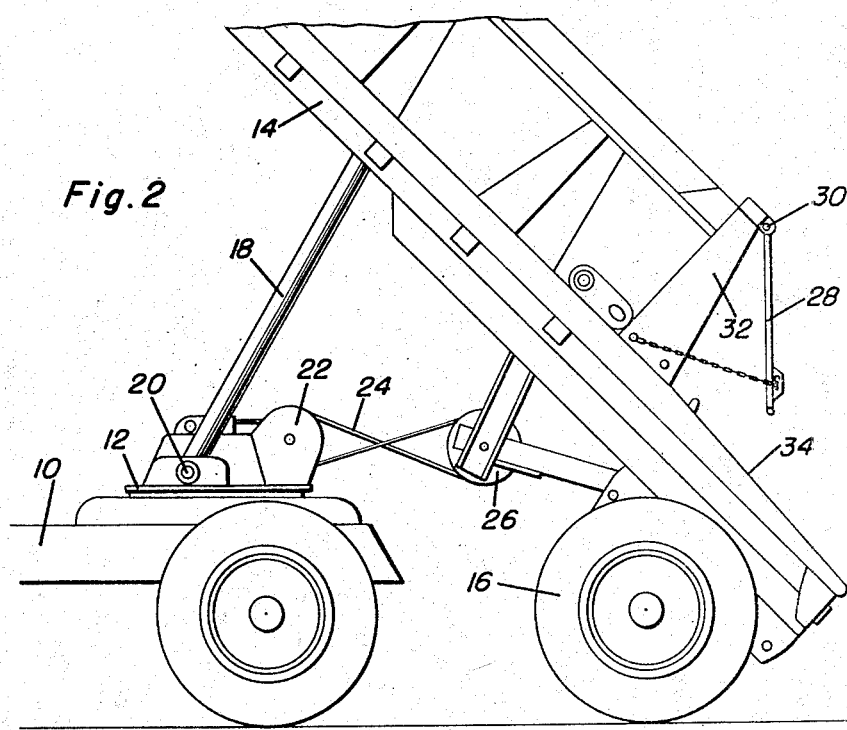
Edwin A. Schonrock
INVENTOR.

Nov. 6, 1956    E. A. SCHONROCK    2,769,661
TAIL GATE, APRON AND AXLE PLACEMENT
CONSTRUCTION FOR DUMP TRAILERS
Filed June 29, 1953    2 Sheets-Sheet 2
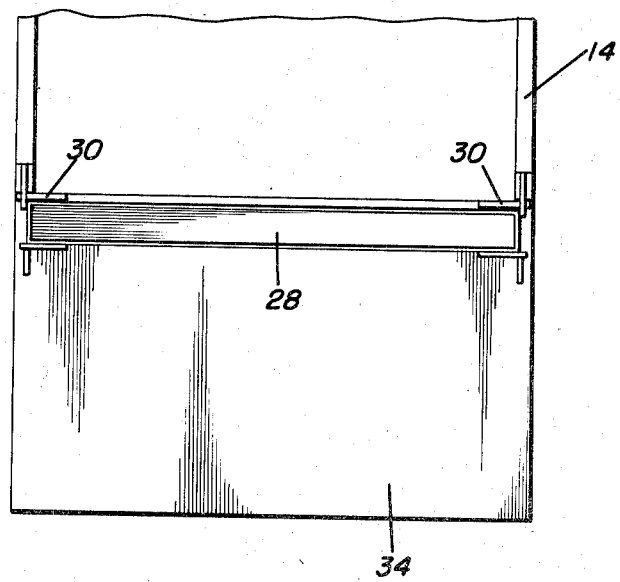
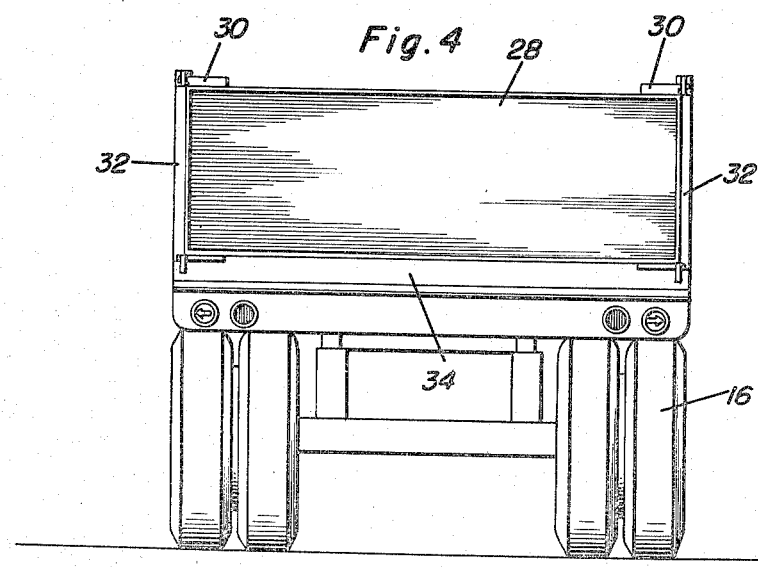
Edwin A. Schonrock
INVENTOR.

United States Patent Office 2,769,661
Patented Nov. 6, 1956

2,769,661

TAIL GATE, APRON AND AXLE PLACEMENT CONSTRUCTION FOR DUMP TRAILERS

Edwin A. Schonrock, San Angelo, Tex.

Application June 29, 1953, Serial No. 364,708

5 Claims. (Cl. 298—20)

This invention comprises novel and useful improvements in a tail gate, apron, and axle placement construction for dump trailers and more specifically pertains to an improved disposition of the rear end portions of a dump trailer and particularly a trailer of the cable dump-type, for improving the placement of a load upon a trailer and the discharging of the contents of the trailer when the latter is vertically pivoted about the rear axle of the same.

The fundamental purpose of this invention is to provide an improved disposition, arrangement and relative positioning of the rear end wall and tail gate of the body of a dump trailer with a view to improving the distribution of the load upon the trailer chassis; and beneficially effecting the dumping of the load when the trailer is elevated into dumping position.

A further object of the invention is to provide a dump trailer construction in accordance with the preceding object which shall be particularly applicable to very large capacity dump trailers and especially for trailers of the cable dump-type.

Further important objects of the invention are to provide a cable dump trailer wherein the center of the gravity of the load shall be disposed well forward of the rear axle of the trailer, even in the elevated or vertically tilted dumping position of the trailer; and wherein there is provided an apron upon the rear portion of the trailer chassis to facilitate and improve the dumping or discharging of the contents of the trailer by gravity at a selected site.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the rear portion of a cable dump trailer in accordance with the principles of this invention, the trailer being shown in its lowered or load carrying position;

Figure 2 is a side elevational view of a portion of a tractor and a cable dump trailer associated therewith, in accordance with this invention, the trailer being shown in its vertically tilted or inclined dumping position;

Figure 3 is a top plan view of the rear portion of the cable dump trailer in accordance with Figure 1; and Figure 4 is a rear end view of the trailer of Figure 1.

Referring now more specifically to the accompanying drawings, wherein like numerals designate similar parts throughout the various views, attention is directed first to Figure 2 wherein the numeral 10 designates any convenient form of tractor or cab unit, having a fifth wheel assembly 12 thereon with which is operatively associated dump trailer 14. The tractor or cab unit 10 may, of course, be of any desired construction, while the dump trailer illustrated may be of any suitable type, being preferably of the same general type of dump trailer disclosed in my prior Patents Numbers 2,514,726; 2,517,933; 2,637,593; 2,661,236; and my prior copending application Serial Number 305,573.

In general, the type of trailer illustrated includes a single axle wheel assembly 16, although if desired, a tandem rear wheel axle assembly, such as disclosed and claimed in my prior Patent Number 2,661,236, may be employed. A pair of rods comprising lift arms 18 are pivotally connected at one end to the chassis of the dump trailer 14, and their other ends are pivoted, as at 20, to a fifth wheel assembly 12. Likewise carried upon the fifth wheel assembly is a sheave assembly 22 operatively connected to a cable 24 which is connected to a power operated winch upon the tractor, not shown, and to pulleys 26 mounted upon the chassis of the dump trailer 14 to shorten the wheel base of the trailer and tractor assembly, as shown in Figure 2, this shortening in the wheel base will result in vertical tilting of the lift arms and consequently of the dump trailer 14 from the position shown in Figure 1 to that shown in Figure 2.

Alternatively the sheave assembly 22 could be replaced by a power operated winch mounted upon the fifth wheel 12.

In my prior copending applications and patents, above identified, the body of the dump trailer extended substantially to the rear end of the chassis thereof, so that the tail gate assembly was disposed at the rear end of the chassis. In the present invention, however, the rear end and tail gate assembly is moved forwardly of the rear axle assembly. Thus, a tail gate 28 is pivoted as at 30 at its upper end to a pair of vertical posts 32 forming the rear end of the body of the dump trailer. As will be apparent, the tail gate is sloping or inclined downwardly and rearwardly of the trailer body when the latter is in its lowered position, as shown in Figure 1, and is adapted to open under the influence of gravity, as shown in Figure 2, when the body is raised to its dumping position. It is, of course, understood that any suitable tail gate operators and tail gate latches, as for example, those disclosed and claimed in my copending application Serial Number 305,573, may be employed with the features of the present invention.

The floor or base of the chassis of the dump trailer 14, between the tail gate and the rear end of the chassis is provided with a slightly inclined flat surface 34 constituting an apron for discharging the contents of the dump body when the latter is raised into its dumping position, shown in Figure 2.

It will thus be observed that the rear end of the body terminates with the tail gate 28 substantially forward of the rear axle assembly 16, whereby the load carried by the dump trailer is supported entirely in front of this axle. This provides a better distribution of load between the front axle assembly, consisting of the rear wheel assembly of the tractor unit 10 and the rear axle assembly 16 of the trailer. In addition, it thus materially lessens the weight of the rear axle assembly thereby meeting the requirements of various states with regard to maximum loads carried by truck and trailer axle assemblies. Moreover, this forward disposition of the tail gate and rear end of the trailer body, with reference to the rear axle assembly, results in the load being carried entirely forwardly of the rear axle asembly even when the trailer is in its dumping position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A dump trailer comprising a chassis and a rear axle assembly therefor, a body on said chassis, a tail gate assembly for said body, said body and said tail gate assembly being each disposed forwardly of said rear axle assembly whereby to locate the entire load of the body forwardly of the rear axle assembly, said chassis being mounted upon said rear axle assembly for vertical tilting movement thereabout between a substantially horizontal load carrying position and a sharply inclined dumping position, said chassis having an apron extending from the tail gate assembly rearwardly of the rear axle assembly.

2. The combination of claim 1, wherein said tail gate assembly includes a pair of rear body posts extending vertically of the trailer chassis, said posts having downwardly and rearwardly sloping gate receiving surfaces, a tail gate mounted upon said posts at their upper ends by horizontal hinge pins.

3. The combination of claim 1, wherein said apron is inclined rearwardly and downwardly of said tail gate assembly.

4. The combination of claim 1 including means for connecting said trailer to a tractor vehicle and for vertically tilting the trailer to dumping position.

5. The combination of claim 4, including an apron, wherein said apron is inclined rearwardly and downwardly of said tail gate assembly.

References Cited in the file of this patent

UNITED STATES PATENTS

| | | |
|---|---|---|
| 152,642 | Jenkins | June 30, 1874 |
| 1,153,179 | Copenhagen | Sept. 7, 1915 |
| 1,701,486 | Askren | Feb. 5, 1929 |
| 2,321,198 | Graves | June 8, 1943 |
| 2,490,532 | Maxon | Dec. 6, 1949 |
| 2,542,795 | Clement et al. | Feb. 20, 1951 |
| 2,658,795 | Nicholson | Nov. 10, 1953 |
| 2,692,796 | Rittenhouse | Oct. 26, 1954 |

FOREIGN PATENTS

| | | |
|---|---|---|
| 340,375 | France | May 11, 1904 |